United States Patent Office 3,287,403
Patented Nov. 22, 1966

3,287,403
PREPARATION OF NAPHTHALENE
DICARBOXYLIC ACIDS
Edward J. McNelis, Wallingford, and Herbert L. Johnson, Media, Pa., assignors to Sun Oil Company, Philadelphia, Pa., a corporation of New Jersey
No Drawing. Filed Oct. 4, 1962, Ser. No. 228,259
11 Claims. (Cl. 260—515)

This invention relates to the preparation of naphthalene dicarboxylic acids. More specifically it relates to the dehydrogenation of dihydronaphthalene dicarboxylic acids or the alkali metal salts of dihydronaphthalene dicarboxylic acids to form naphthalene carboxylic acids or salts of naphthalene carboxylic acids. The naphthalene carboxylic acids can be converted to alkali metal carboxylates and the latter can be pyrolyzed in the presence of a catalyst to yield alkali metal naphthalene-2,6-dicarboxylate which can be acidified to produce naphthalene-2,6-dicarboxylic acid. The invention provides a means of producing such dicarboxylic acid from naphthalene.

Naphthalene dicarboxylic acid in which the carboxyl groups are located at the 2,6-positions is a highly desired compound since it can be used for making polyester type polymers which have exceptionally good properties for making fibers and related materials. Naphthalene-1,2-dicarboxylic acid or its anhydride and naphthalene-1,4-dicarboxylic acid are intermediates in the production of naphthalene-2,6-dicarboxylic acid by the process of this invention. These intermediates themselves have utility in making resins, ester-type polymers and ester-type plasticizers.

Naphthalene-2,6-dicarboxylic acid can be prepared by the liquid phase oxidation of 2,6-dimethylnaphthalene by means of molecular oxygen at temperatures in the range of 100–250° C. and in the presence of cobalt or other metal oxidation catalysts and a bromine compound as described in Saffer et al., United States Patent No. 2,833,816. Oxidizing agents such as alkali dichromates also can be used for the oxidation of 2,6-dimethylnaphthalene to 2,6-naphthalene dicarboxylic acid.

A difficulty in producing 2,6-naphthalene dicarboxylic acid by the oxidation of 2,6-dimethylnaphthalene lies in finding a suitable source of 2,6-dimethylnaphthalene. This compound occurs in coal tar and in cracked petroleum distillates of the appropriate boiling range but only in low proportions and associated with it are other dimethylnaphthalene isomers and other hydrocarbons. The separation of 2,6-dimethylnaphthalene in high purity by extraction and fractional crystallization adds greatly to the cost of producing the 2,6-diacid in this manner.

In one aspect, the present invention provides a process for preparing naphthalene-2,6-dicarboxylic acid from a more readily available and less expensive starting material, namely, naphthalene. In this aspect of the invention the following transformations are effected:

(1) Naphthalene is reacted with sodium or potassium in the presence of an ether-type solvent to form an alkali metal naphthalene complex.

(2) This complex is reacted with carbon dioxide in the presence of the solvent to form alkali metal dihydronaphthalene dicarboxylates in which the carboxyl groups are located at positions other than the 2,6-positions.

(3) The alkali metal dihydronaphthalene dicarboxylates or their corresponding diacids and/or anhydrides are dehydrogenated at elevated temperature to form naphthalene carboxylic compounds which may be either monocarboxylic or dicarboxylic compounds depending upon whether the dihydronaphthalene disalt or diacid is the material dehydrogenated and the dehydrogenation conditions as hereinafter more fully described.

(4) The resulting naphthalene carboxylic compounds, in the form of salts of potassium, rubidium or cesium, are rearranged by pyrolysis in the presence of a suitable catalyst to form alkali metal naphthalene-2,6-dicarboxylate from which the 2,6-diacid can readily be obtained by acidification.

In another aspect the invention involves the conversion of dihydronaphthalene dicarboxylic compounds, which can be diacids, anhydrides or alkali metal dicarboxylates prepared in any known or suitable manner, to naphthalene carboxylic compounds by dehydrogenation. Such conversion can be achieved in the following alternative ways:

(1) By heating any dihydronaphthalene dicarboxylic acid or anhydride to a temperature in the range of 250–350° C., hydrogen will be evolved and the corresponding naphthalene dicarboxylic acid or anhydride will be formed.

(2) By heating an alkali metal dihydronaphthalene dicarboxylate in which the alkali metal is potassium, rubidium or cesium to a reaction temperature in the range of 180°–280° C., both hydrogen and carbon dioxide will be evolved and alkali metal naphthalene monocarboxylate will be formed. The monocarboxylate can be acidified to produce the monocarboxylic acid.

(3) By heating any alkali metal dihydronaphthalene dicarboxylate in the presence of sulfur in amount of at least one mole per mole of the dicarboxylate to a temperature in the range of 150–250° C., hydrogen sulfide will be evolved and the corresponding alkali metal naphthalene dicarboxylate will be formed. The latter can be acidified to produce the naphthalene dicarboxylic acid.

The terms "dihydronaphthalene dicarboxylic acid" and "naphthalene dicarboxylic acid" as used herein are intended to include not only the diacids but also any corresponding anhydrides that are extant. For example, when dihydronaphthalene-1,2-dicarboxylic acid is heated to an elevated temperature such as is used in the dehydrogenation step of the present process, it will be converted to the anhydride which, upon dehydrogenation, will yield the naphthalene-1,2-dicarboxylic acid anhydride. Thus for the present purpose the anhydrides are equivalent to their corresponding diacids, and for the sake of simplicity the terms defined above are intended to mean either or both the diacids and the anhydrides.

In converting naphthalene to the 2,6-diacid derivative, the first step in the process comprises reacting the naphthalene in an ether-type solvent, such as ethylene glycol dimethyl ether, with metallic sodium or potassium. This reaction can be carried out merely by contacting the naphthalene in an ether solution at a temperature in the range of 10–50° C. with the alkali metal preferably in finely dispersed form. Preferably a contact time of 10–24 hours is employed to permit completion of the reaction. In the reaction a complex between the alkali metal and the naphthalene forms without the release of hydrogen and the reaction mixture develops a green color. This complex is stable only in the presence of the ether solvent and will decompose if the solvent is removed.

Ethers that can be used for effecting the foregoing metallation reaction are of a type that possess the ability to promote or aid in the formation of the alkali metal hydrocarbon complex. These ethers include any aliphatic mono-ether having a methyl group. Examples include dimethyl ether, methyl ethyl ether, methyl-n-propyl ether, methyl isopropyl ether, and mixtures of these methyl ethers. Other satisfactory ethers include certain polyethers such as the acrylic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, methyl butyl, ethyl butyl, dibutyl, and butyl lauryl ethylene glycol ethers, trimethylene glycol dimethyl ether, glycerol trimethyl ether, glycerol dimethyl ethyl ether, and diethylene glycol methyl ethyl ether, glycol formal, methyl glycerol formal, and the like.

The ethers used in conjunction with the metallation reaction should not contain any groups such as hydroxyl or carboxyl which are distinctly reactive toward the alkali metal. Although the ether may react in some manner not completely understood, it must not be subject to any action that destroys the ether or uses up the alkali metal or tends to induce polymerization rather than the desired reaction.

The next step in the process involves reacting the alkali metal-naphthalene complex in the ether solvent with carbon dioxide at a temperature in the range of —80° to 40° C. This can conveniently be carried out merely by filtering the reaction mixture to remove excess alkali metal and then adding Dry Ice and allowing the excess carbon dioxide to evaporate. Reaction of carbon dioxide with the complex causes the formation of the alkali metal salts of dihydronaphthalene dicarboxylic acids in which the carboxyl groups are located at the 1,2- and 1,4-positions and the simultaneous formation of naphthalene. After the reaction is complete, the mixture can be filtered to separate the alkali metal disalts which, if desired, can be washed with diethyl ether to remove occluded solvent. The naphthalene can be extracted from the filtrate by means of a hydrocarbon solvent such as hexane or heptane, recovered from the extract by evaporation of the solvent and recycled for reuse in the first step of the process. The dihydro-naphthalene dicarboxylates can then be subjected to dehydrogenation as hereinafter described. Alternatively these disalts can be dissolved in water and converted to the corresponding diacids by acidification with a mineral acid such as hydrochloric acid. Such acidification will produce a water-insoluble fraction composed mainly of trans-1,4-dihydronaphthalene dicarboxylic acid-1,4 and 1,2-dihdronaphthalene dicarboxylic acid-1,2 and a water-soluble fraction in which the diacids are mainly the cis-1,4-dihydronaphthalene dicarboxylic acid-1,4 and 1,2-dihydronaphthalene dicarboxylic acid-1,2. The water-insoluble fraction can be separated by filtration while the water-soluble fraction can be recovered by extraction of the water phase with diethyl ether. Alternatively the entire acidified mixture can be extracted with diethyl ether and the mixed diacids can be obtained by separating the non-aqueous phase and evaporating the diethyl ether therefrom.

Properties of the dihydronaphthalene dicarboxylic acids prepared by the foregoing procedure and of four other isomers which can be obtained in various ways from the isomers produced have been described by T. M. Lyssy, J. Org. Chem., 27, 5 (1962). For the purpose of the present invention any of these dihydronaphthalene diacids or mixture of diacids are suitable materials for dehydrogenation to produce naphthalene carboxylic compounds. Likewise any other isomers of dihydronaphthalene dicarboxylic acid prepared by other procedures can be dehydrogenated in accordance with the invention to produce naphthalene carboxylic compounds.

The next step in the process comprises conversion of the product from the carbon dioxide-alkali metal naphthalene complex reaction by dehydrogenation. When the product is obtained in the diacid form, the dehydrogenation is effected merely by heating the dihydronaphthalene diacids to a temperature in the range of 250–350° C., more preferably 300–330° C., in the presence of an inert atmosphere such as nitrogen, hydrogen or other inert gas. The rate of hydrogen evolution depends upon the temperature to which the diacids are heated within the prescribed temperature range and can be controlled as desired by regulation of temperature. The time of heating will vary depending upon the temperature level selected. In any event the reaction temperature should be maintained until substantial evolution of hydrogen ceases. The products resulting from this thermal dehydrogenation reaction are naphthalene-1,2-dicarboxylic acid anhydride, naphthalene-1,2-dicarboxylic acid and naphthalene-1,4-dicarboxylic. Yields are generally in excess of 80% of the theoretical in this step.

When the product from the carbon dioxide-alkali metal naphthalene complex reaction is obtained in the form of a disalt, either of two procedures can be used to effect dehydrogenation and produce a naphthalene carboxylate salt. In one of these procedures the disalt is thermally dehydrogenated and simultaneously partially decarboxylated by heating to a reaction temperature in the range of 180°–280° C. This causes hydrogen and carbon dioxide to be evolved and results in the formation of alkali metal naphthalene monocarboxylates. In this procedure the alkali metal moiety must be potassium, rubidium or cesium, inasmuch as the sodium dihydronaphthalene dicarboxylates are too stable to undergo the dehydrogenation and decarboxylation reactions. The reaction temperature that should be used varies somewhat depending upon which alkali metal is a component of the disalt. For potassium the temperature should be in the range of 225–280° C., for rubidium 200–260° C. and for cesium 180–240° C. Temperatures higher than those specified for the respective alkali metals should be avoided as otherwise both carboxyl groups will be eliminated from the dicarboxylates. Removal of both carboxyl groups also tends to occur to some extent in the specified temperature ranges but this tendency can be counteracted by avoiding excessive reaction times. Generally reaction times between 5 and 60 minutes should be employed, and the optimum time will vary depending upon the particular temperature level selected within the prescribed ranges. Typically, reaction times of 10–25 minutes should be used when the temperature employed is about in the middle of the ranges. The product of the reaction will comprise not only the alkali metal monocarboxylates, including both $\alpha$- and $\beta$-naphthoates typically in a ratio of 1:4, but also a substantial amount of naphthalene resulting from elimination of both carboxyl groups. The naphthalene can be separately recovered by extracting the reaction product with a suitable solvent such as hexane and recycled to the first step of the process.

When the invention is practiced using the foregoing dehydrogenation and partial decarboxylation reaction of the disalts of potassium, rubidium or cesium, several alternative procedures in the preceding operations can be practiced. If potassium has been used as the alkali metal in the initial step of the process, then the resulting potassium disalt can be recovered from the reaction mixture and used directly in the dehydrogenation-decarboxylation step. On the other hand, if sodium is the alkali metal employed, the sodium dihydronaphthalene dicarboxylate must be converted to one of the other alkali metal disalts prior to the dehydrogenation-decarboxylation reaction. This can be done by ion exchange or by first converting the sodium disalt to the diacid by means of a mineral acid and then neutralizing the diacid by means of a hydroxide of potassium, rubidium or cesium. Potassium hydroxide is the least expensive and is preferred.

The other procedure for dehydrogenating the product from the carbon dioxide-alkali metal naphthalene complex reaction involves the use of sulfur to promote dehydrogenation and is applicable to any alkali metal dihydronaphthalene dicarboxylate. The procedure comprises heating the alkali metal dihydronaphthalene dicarboxylate in the presence of sulfur in amount of at least one mole per mole of the dicarboxylate to a temperature in the range of 150–250° C., more preferably 200–300° C. The reaction time will vary with the temperature used but generally should be in the range of 0.1–2 hours. In this reaction hydrogen sulfide is evolved and alkali metal naphthalene dicarboxylates are formed. Little if any decarboxylation occurs in this reaction and hence the product does not include any substantial amount of monocarboxylate. After the reaction the product can be extracted with carbon disulfide to remove excess sulfur. The dicarboxylate product can then be dissolved in water and acidified with a mineral acid to form naphthalene dicarboxylic acids. This causes precipitation of the 1,4-diacid which can be separately recovered. The 1,2-diacid, which generally is obtained at least in part in the form of its anhydride, remains in aqueous solution and can be recovered therefrom by extraction with diethyl ether and evaporation of the ether. The yield of naphthalene diacids, including any anhydride, obtained in this manner typically is of the order of 80% of the theoretical.

The foregoing alternative procedures for converting dihydronaphthalene dicarboxylic compounds to naphthalene carboxylic compounds are not only applicable to the dicarboxylic compounds obtainable from the second step of the process as above described but also to dihydronaphthalene dicarboxylic compounds prepared in any other manner. Thus diacids, anhydrides and alkali metal disalts of dihydronaphthalene in which the carboxyl groups are located at positions other than the 1,2- and 1,4- positions can also be dehydrogenated by the procedures described above and analogous reactions will occur. For example, dihydronaphthalene-2,6-diacid can be thermally dehydrogenated to naphthalene-2,6-diacid, the alkali metal disalts of such acid can be dehydrogenated in the presence of sulfur to produce the alkali metal naphthalene-2,6-dicarboxylate or the potassium, cesium and rubidium disalts of such acid can be thermally dehydrogenated and partially decarboxylated to produce alkali metal naphthalene monocarboxylates.

When it is desired to obtain the naphthalene-2,6-diacid from the dicarboxylic or monocarboxylc naphthalene compounds obtained from the various dehydrogenation procedures described above, such compounds in the form of potassium, rubidium or cesium salts can be pyrolyzed in the presence of a suitable catalyst to yield naphthalene dicarboxylate in which the carboxyl groups are located at the 2,6-positions. The same reaction conditions apply for the pyrolysis of the monocarboxylates as for the dicarboxylate compounds. With the latter a rearrangement of the carboxylate groups on the naphthalene nucleus occurs whereby the 2,6-positioning of the carboxylate groups results. In the case of the monocarboxylates a disproportionation reaction occurs whereby carboxylate groups are transferred intermolecularly, resulting in the formation of naphthalene and alkali metal naphthalene-2,6-dicarboxylate. The naphthalene can be separately recovered from the reaction product and recycled to the first step of the process.

In carrying out the pyrolysis the potassium, rubidium or cesium monocarboxylate or dicarboxylate salts, as the case may be, are mixed with a catalyst and the mixture is heated to a temperature in the range of 350–530° C., more preferably 450–510° C., under an atmosphere of carbon dioxide at a pressure of 50–750 p.s.i.g. and more preferably 100–300 p.s.i.g. The catalyst for the reaction can be any of the oxides or salts of cadmium, zinc or mercury. In the case of salts they can be derivatives of either organic or inorganic acids. The cadmium oxides or salts seem to be more effective than zinc or mercury compounds and are preferred. The following are examples of catalysts that can be used: cadmium sulfate, cadmium fluoride, cadmium acetate, cadmium benzoate, cadmium bromate, cadmium oxalate, and the corresponding zinc and mercury analogues. The amount of catalyst employed can vary widely but preferably is in the range of 2 to 10 moles per 100 moles of the carboxylate salts. The time that the reaction mixture is maintained within the temperautre range of 350–530° C. can vary considerably, for example, from 0.1 to 5 hours. However, it is distinctly preferable merely to heat the mixture to the desired temperature level, which preferably is in the range of 450–510° C., and then allow it to cool immediately. This procedure has been found to minimize undesirable side reactions and result in higher yields of the 2,6-product than when the reaction temperature is maintained for a considerable time.

In addition to the desired 2,6-dicarboxylate product some naphthalene and other by-products are formed in the reaction even when the charge material to the pyrolysis is dicarboxylate salts. These can be removed from the reaction mixture by evaporation at elevated temperature, for example, by venting the system while the reaction mixture is still hot. The by-products can also be removed by extraction from the salts with a suitable solvent, e.g., benzene or ethyl ether. After the 2,6-disalt has been freed of the volatile or hydrocarbon soluble by-products, it is dissolved in water and filtered to remove any carbonaceous material that may have formed during the reaction. The filtrate is then acidified by means of a mineral acid to convert the salt to naphthalene-2,6-dicarboxylic acid which forms as a precipitate and can be recovered by filtration. Generally minor amounts of other naphthalene dicarboxylic acids resulting from incomplete rearrangement in the Henkel reaction will be present in the 2,6-product. These other acids can be selectively removed from the desired product by washing it with methanol, since the 2,6-diacid has distinctly lower solubility in alcohol than the other isomers. When a high purity 2,6-product is desired, it may be desirable to carry out such washing step at elevated temperature to insure effective removal of the other isomers.

The following examples illustrate the nature of our invention:

EXAMPLE I

*Preparation of dihydronaphthalene dicarboxylic acids*

A one molar solution of naphthalene dissolved in ethylene glycol dimethyl ether is placed in a reactor equipped with a stirrer and a suitable gas inlet and vent through which an inert gas such as nitrogen is circulated during the reaction. Sodium in the form of shavings or chips is added to the reactor in a mole ratio of 1.05 based on the naphthalene. As the sodium naphthalene forms, the reaction mixture turns green. The temperature rises to 35–40° C. and should be maintained within that range throughout the reaction period of 10–20 hours. Excess sodium is then filtered from the sodium naphthalene solution as it is transferred to another stirred reactor containing a slurry of Dry Ice in ethylene glycol dimethyl ether at a temperature of about −70° C. Reaction of the sodium naphthalene with the carbon dioxide causes the formation of sodium dihydronaphthalene dicarboxylate salts which precipitate from the mixture. Naphthalene is also formed in this reaction and remains mainly in solution in the solvent. After the excess carbon dioxide has evaporated, the sodium salt mixture is separated by filtration and is washed with petroleum naphtha to remove any occluded naphthalene. The salts are then dissolved in water and the salt solution is acidified with a slight excess of hydrochloric acid. Impure 1,4-dihydronaphthalene dicarboxylic acid-1,4 precipitates and is recovered by filtration in a yield of about 55% of theory. After recrystallization from glacial acetic acid this product has a melting point of 220–222° C. which corresponds to the literature value for trans-1,4-dihydronaphthalene dicarboxylic acid-1,4. Extraction of the filtrate from the separation of the crude 1,4-dihydronaphthalene dicarboxylic-1,4 acid with diethyl ether yields an additional 25% of light brown acids. This fraction is a mixture of trans-1,2-dihydronaphthalene dicarboxylic acid-1,2 and cis-1,4-dihydronaphthalene dicarboxylic acid-1,4. The overall yield of dihydronaphthalene dicarboxylic acids is of the order of 80 mole percent based on the naphthalene consumed.

EXAMPLE II

*Dehydrogenation of dihydronapththalene dicarboxylic acids*

In a 100 ml. flask equipped with stirrer and a gas inlet and vent for use of an inert atmosphere are placed 43.6 grams (0.2 mol) of 1,2-dihydronaphthalene dicarboxylic acid-1,2 prepared according to Example I. The flask is heated to 250–300° C. under an atmosphere of nitrogen. Within this temperature range hydrogen and water are evolved. The water is a result of the formation of the 1,2-anhydride the presence of which can be shown by the infrared spectrum of the reaction product. The reaction is complete in about 20 minutes. After cooling to about 100° C. the product is dissolved in hot water. Naphthalene-1,2-dicarboxylic acid precipitates in a yield of 89% of theory upon cooling the aqueous solution to room temperature. The melting point of the diacid product is 177° C.

EXAMPLE III

In an experiment similar to Example II 43.6 grams (0.2 mol) of the acid obtained as a precipitate in Example I are heated to 280° C. for 10 minutes and the product is processed as described in Example II. 1,4-naphthalene dicarboxylic acid, 1,2-naphthalene dicarboxylic acid anhydride and 1,2-naphthalene dicarboxylic acid are obtained in 75% yield. Infrared analysis of the product shows that substantially no dihydronaphthalene dicarboxylic compounds are present.

EXAMPLE IV

*Dehydrogenation of mixed dihydronaphthalene dicarboxylic acids*

In an experiment similar to Example II 43.6 grams (0.2 mol) of a mixture of the total diacids produced as in Example I are heated to 250–300° C. for a period of 30 minutes. Hydrogen is evolved and the evolution thereof ceases in about 20 minutes. An infrared spectrum of the product shows complete conversion of the dihydronaphthalene dicarboxylic acids. The yield of naphthalene dicarboxylic acids (including anhydride) is about 80%.

EXAMPLE V

*Dehydrogenation and decarboxylation of dihydronaphthalene dicarboxylate and pyrolysis of resulting monocarboxylate*

Mixed potassium dihydronaphthalene dicarboxylates containing 3 weight percent of cadmium chloride are placed in a steel bomb, the bomb is purged and pressured to 100 p.s.i.g. with nitrogen and is then heated to 264° C. for 15 minutes, after which the bomb is cooled to room temperature and the gas is vented. Analysis of the vent gas shows 1.5% hydrogen, 2.7% $CO_2$ and the remainder nitrogen. The bomb is then pressured to 300 p.s.i.g. with carbon dioxide, heated to 475° C. and cooled to room temperature. Naphthalene is extracted from the reaction mixture with diethyl ether, and the resulting potassium salts are dissolved in water and acidified. The yields of naphthalene and 2,6-naphthalene dicarboxylic acid obtained are 58% and 16% of theory respectively.

EXAMPLE VI

This experiment is performed in the same way as Example V except that cadmium chloride is not added until after an initial heating step of 20 minutes at 250–255° C. Analysis of the vented gas from the initial heating step shows 1.5% hydrogen, 1.6% carbon dioxide and the remainder nitrogen. The solid product comprises a mixture of alpha and beta potassium naphthoates. Infrared analysis of a small sample of the reaction product after acidification shows that neither dihydronaphthalene dicarboxylic acids nor naphthalene dicarboxylic acids are present. The dehydrogenated salt mixture is pulverized and mixed with 3 weight per cent of cadmium chloride, the mixture is charged to the bomb and the bomb is heated to 475° C. and then cooled to room temperature. The products are recovered as described in Example V. The yields of naphthalene and 2,6-naphthalene dicarboxylic acid are 50 and 39% respectively based on the potassium dihydronaphthalene dicarboxylates charged.

EXAMPLE VII

*Dehydrogenation of dihydronaphthalene dicarboxylates using sulfur*

Mixed crude sodium salts (262 g.) of dihydronaphthalene dicarboxylic acids prepared according to Example I are mixed with sulfur (128 g.) and the mixture is heated in a nitrogen atmosphere. At 160° C. the odor of $H_2S$ can be detected. The temperature is held at 230–240° C. for 30 minutes. After cooling, carbon disulfide is used to remove excess sulfur. The salts are dissolved in water, the aqueous mixture is acidified and the resulting precipitate is separated by filtration. After drying it weighs 143 grams. The infrared spectrum of this material is identical with that of 1,4-naphthalene dicarboxylic acid. Ether extraction of the filtrate from the 1,4-naphthalene dicarboxylic acid gives 33 grams of extract composed of 1,2-naphthalene dicarboxylic acid and its anhydride. The overall yield of naphthalene dicarboxylic acids (including anhydride) is 81% of the theoretical.

When other dihydronaphthalene dicarboxylic acids or their salts are dehydrogenated by the procedures shown in the Examples IV–VII, analogous results are obtained.

Thermal dehydrogenation of the potassium salts of dihydronaphthalene dicarboxylic acids results in dehydrogenation and removal of at least one of the carboxyl groups as shown by Examples V and VI above. The same is true when cesium or rubidium are substituted for potassium. By the proper choice of time and temperature it is possible to minimize the yield of naphthalene and to convert the dihydronaphthalene dicarboxylates to naphthoates in yields of 80–90%. The naphthalene formed in this operation may be recovered and recycled to the first step of the process. Since carboxyl groups are lost in the thermal dehydrogenation of these dihydronaphthalene dicarboxylates, thermal dehydrogenation of the dihydronaphthalene diacids is a more attractive procedure for producing the naphthalene diacids. Dehydrogenation of the dihydronaphthalene disalts using elemental sulfur is also more attractive since decarboxylation likewise does not occur in this procedure.

The invention claimed is:

1. A process for the dehydrogenation of dihydronaphthalene dicarboxylic compounds selected from the group consisting of dihydronaphthalene dicarboxylic acids and alkali metal dihydronaphthalene dicarboxylates which comprises heating said compounds in the absence of sulfur to a temperature of 150–350° C. to form naphthalene carboxylic acid compounds.

2. Method for the dehydrogenation of dihydronaphthalene dicarboxylic compounds which comprises heating a dihydronaphthalene dicarboxylic acid in the absence of sulfur to a temperature in the range of 250–350° C., whereby hydrogen is evolved and a corresponding naphthalene dicarboxylic acid is formed.

3. Method according to claim 2 wherein said temperature is in the range of 300–330° C.

4. Method for dehydrogenating and partially decarboxylating dihydronaphthalene dicarboxylates which comprises heating an alkali metal dihydronaphthalene dicarboxylate in which the alkali metal is selected from the group consisting of potassium, rubidium and cesium to a reaction temperature in the range of 180–280° C., whereby hydrogen and carbon dioxide are evolved and alkali metal naphthalene monocarboxylate is formed.

5. Method according to claim 4 wherein the alkali metal is potassium and the temperature is in the range of 225–280° C.

6. Method according to claim 4 wherein the alkali metal is rubidium and the temperature is in the range of 220–260° C.

7. Method according to claim 4 wherein the alkali metal is cesium and the temperature is in the range of 180–240° C.

8. A process for producing naphthalene-2,6-dicarboxylic acid which comprises (1) heating a dihydronapthalene dicarboxylic acid other than the 2,6-acid in the absence of sulfur to a temperature in the range of 250–300° C. whereby hydrogen is evolved and naphthalene dicarboxylic acid is formed; (2) converting the naphthalene dicarboxylic acid to corresponding alkali metal disalt in which the alkali metal is selected from the group consisting of potassium, cesium and rubidium; (3) heating said alkali metal disalt in the presence of a catalyst selected from the group consisting of oxides and salts of cadmium, zinc and mercury to a temperature in the range of 350–530° C.; (4) and acidifying the resulting alkali metal disalt to form naphthalene-2,6-dicarboxylic acid.

9. Process according to claim 8 wherein the temperature in step (3) is in the range of 450–510° C.

10. A process for producing naphthalene-2,6-dicarboxylic acid which comprises (1) heating potassium dihydronaphthalene dicarboxylate to a temperature in the range of 225–280° C., whereby hydrogen and carbon dioxide are evolved and potassium naphthalene monocarboxylate is formed; (2) heating said monocarboxylate in the presence of a catalyst selected from the group consisting of oxides and salts of cadmium, zinc and mercury to a temperature in the range of 350-530° C., whereby potassium naphthalene-2,6-dicarboxylate and naphthalene are formed; (3) recovering potassium naphthalene-2,6-dicarboxylate from the reaction mixture; and (4) converting such dicarboxylate to naphthalene-2,6-dicarboxylic acid by acidification.

11. Process according to claim 10 wherein the temperature in step (2) is in the range of 450–510° C.

References Cited by the Examiner
UNITED STATES PATENTS 2,849,482   8/1958   Raecke _____ 260—515

OTHER REFERENCES

Sherwood: Chemistry and Industry, 1096, Aug. 27, 1960.

Walker et al.: J. American Chemical Society, 60, 951–955 (1938).

Lyssy: J. Organic Chemistry, 27, 5–13 (1962).

Yagi et al.: Chemical Abstracts, 53, 3032 (1959).

LORRAINE A. WEINBERGER, *Primary Examiner.*

LEON ZITVER, *Examiner.*

R. E. MASSA, T. L. GALLOWAY, *Assistant Examiners.*